(12) United States Patent
Winkler

(10) Patent No.: US 12,552,447 B2
(45) Date of Patent: Feb. 17, 2026

(54) HYDRAULIC REAR AXLE STEERING

(71) Applicant: Weber-Hydraulik GmbH, Güglingen (DE)

(72) Inventor: Torsten Winkler, Pfaffenhofen (DE)

(73) Assignee: Weber-Hydraulik GmbH, Güglingen (DE)

( * ) Notice: Subject to any disclaimer, the term of this patent is extended or adjusted under 35 U.S.C. 154(b) by 597 days.

(21) Appl. No.: 18/017,132

(22) PCT Filed: Jul. 21, 2021

(86) PCT No.: PCT/EP2021/070387
§ 371 (c)(1),
(2) Date: Jan. 20, 2023

(87) PCT Pub. No.: WO2022/018135
PCT Pub. Date: Jan. 27, 2022

(65) Prior Publication Data
US 2023/0264735 A1    Aug. 24, 2023

(30) Foreign Application Priority Data

Jul. 21, 2020   (DE) .......................... 102020119239.8
Oct. 20, 2020   (DE) .......................... 102020127621.4

(51) Int. Cl.
*B62D 5/06*    (2006.01)
*B62D 5/12*    (2006.01)
(Continued)

(52) U.S. Cl.
CPC .............. *B62D 5/061* (2013.01); *B62D 5/12* (2013.01); *B62D 5/26* (2013.01); *B62D 5/30* (2013.01)

(58) Field of Classification Search
CPC .. B62D 15/0225; B62D 6/10; B62D 15/0215; F16H 49/005; G01B 7/30;
(Continued)

(56) References Cited

U.S. PATENT DOCUMENTS

| | | | |
|---|---|---|---|
| 4,770,264 A * | 9/1988 | Wright | B62D 7/148 |
| | | | 91/45 |
| 5,099,939 A | 3/1992 | Elser et al. | |

(Continued)

FOREIGN PATENT DOCUMENTS

| | | | | |
|---|---|---|---|---|
| CA | 1288700 C | * | 9/1991 | ............. B62D 7/148 |
| CN | 107010106 B | * | 8/2018 | ............... B62D 5/30 |

(Continued)

*Primary Examiner* — Drew J Brown
(74) *Attorney, Agent, or Firm* — Volpe Koenig

(57) ABSTRACT

A hydraulic rear axle steering for multi-axle vehicles, including a steering cylinder with a piston and two working chambers. The steering cylinder has a mechanical blocking device, which blocks the piston when it reaches a central position within the steering cylinder. The blocking device has a blocking member, which is retained in an engaged position by a locking element in the blocked state. The locking element is movable by a separate, hydraulically actuated actuator between a blocking position and a first unblocking position in which the locking element releases the blocking element. An admission-pressure-controlled load safety valve is provided for each working chamber, and control connections of the valves are connected to a pressure line leading to the respective other working chamber. The actuator is adjusted such that, when a lower, first pressure value is applied, the locking element moves into the unblocking position, and the valves are adjusted such that, when a higher, second pressure value is applied, the valves open towards the tank.

14 Claims, 7 Drawing Sheets

(51) Int. Cl.
*B62D 5/26* (2006.01)
*B62D 5/30* (2006.01)

(58) Field of Classification Search
CPC ... G01B 2210/10; G01M 17/06; G01D 5/145;
G01D 2205/28; G01L 3/105; G01L 5/221
See application file for complete search history.

(56) References Cited

U.S. PATENT DOCUMENTS 8,307,937 B2 * 11/2012 Williams ................ B62D 5/12
180/414
10,486,740 B2 * 11/2019 Christ .................... B62D 7/144

FOREIGN PATENT DOCUMENTS

| | | | | |
|---|---|---|---|---|
| CN | 118182630 A * | 6/2024 | ............... | B62D 5/09 |
| DE | 3902810 A1 * | 8/1989 | ............ | B62D 7/144 |
| DE | 102012105976 | 1/2014 | | |
| DE | 102014113880 | 3/2016 | | |
| DE | 102015109513 | 12/2016 | | |
| DE | 102015108521 B4 * | 4/2024 | ............ | B62D 7/144 |
| EP | 0225773 | 6/1987 | | |
| EP | 0334723 | 3/1989 | | |
| EP | 0397769 B1 * | 6/1992 | ............ | B62D 7/144 |
| EP | 2406119 B1 * | 5/2015 | ............ | B62D 5/061 |
| EP | 3483039 | 5/2019 | | |
| EP | 4470883 A1 * | 12/2024 | ............ | B62D 7/148 |
| EP | 4470884 A1 * | 12/2024 | ............ | B62D 7/148 |
| JP | H06191428 A | 7/1994 | | |
| JP | 2005023957 A | 1/2005 | | |
| KR | 20180116814 A * | 10/2018 | ........... | B62D 7/1563 |
| WO | 2016193091 | 12/2016 | | |
| WO | WO-2022018135 A1 * | 1/2022 | ............ | B62D 7/148 |

* cited by examiner

HYDRAULIC REAR AXLE STEERING

TECHNICAL FIELD

The present invention relates to a hydraulic rear axle steering for multi-axle vehicles, comprising a steering cylinder, which comprises a cylinder chamber, a piston mounted in a sealing manner in the cylinder chamber, which divides the cylinder chamber into two working chambers, and at least one piston rod carried by the piston, wherein the steering cylinder is provided with a mechanical blocking device, which blocks the piston once it reaches a central position within the steering chamber.

BACKGROUND

Heavy vehicles, in particular commercial vehicles for the transport of large loads, mobile cranes, electric commercial vehicles or buses, often have more than two rear axles. In principle, these can be a leading axle and a trailing axle, i.e. axles which are arranged in front of or behind a driven rigid axle. Both arrangements serve to provide a load relief for the driven rigid axle and thus enable a greater payload of the vehicle.

In order to increase the maneuverability of such a vehicle and at the same time to reduce the wear on the tyres and the road surface, these additional vehicle axles are not constituted rigid, but as steering axles, which as a rule follow the deflection according to Ackermann geometry. The effect of this geometrical arrangement is that all the wheels roll on different circular paths and the associated wheel axles have a common centre point when turning in.

Steered rear axles can be constituted positively steered or adhesion-steered. In the case of an adhesion-steered rear axle, the latter is provided with a constructive caster, so that the deflection and the return movement of the wheels takes place in a self-steering manner due to the friction on the road. In the case of a positively steered rear axle, the rear axle steering is connected via a hydraulic cylinder to the chassis. The activation takes place here by means of a motor pump unit, which conveys the oil volume required in each case for the steering movement out of the storage tank into the respective cylinder chamber of the hydraulic cylinder. A bidirectional pump can be used here, which supplies the one or other cylinder chamber with hydraulic fluid depending on the direction of rotation. Furthermore, the two cylinder chambers can be secured to the tank by so-called load safety valves and unblockable non-return valves, so that the hydraulic oil continues to remain in the respective chamber of the cylinder and its position is thus retained when the electric motor is deactivated.

An essential feature of the positively steered rear axles is that, in the event of a fault or a failure of the rear axle steering, in particular when the electric power supply fails, the vehicle continues to be controllable. In the case of a fault, the rear axle steering is brought for this purpose into a secure failure state, in which the wheels stand in a straight-ahead position, the steering thus being centred in the central position. Corresponding steering systems are known for example from DE 10 2012 105 976 A1, DE 10 2014 113 880 A1 and DE 10 2015 109 513 A1.

In order to be able to achieve the desired safe driving state, the steering must be moved back to the central position in the event of a fault without any further intervention by the driver or electrical and controlled variables apart from by the operating principle of adhesion. For this purpose, different valve switches have been implemented, which ensure that external forces that are introduced into the steering cylinder can lead solely to a movement to the central position of the steering cylinder. Drawbacks of the valve arrangements described in the related art consist in the fact that hydraulic fluid can escape and air can be sucked in in the event of a defect of a hydraulic line, as a result of which the rigidity of the steering cylinder is unfavourably affected on account of the compressibility of the penetrated air. Moreover, the safe neutral position can also no longer be maintained in the event of an oil loss due to failure of seals in the steering cylinder.

A rear axle steering with a mechanical blocking device is described in EP 0 255 733 A1. As blocking members, the blocking device comprises a plurality of spheres distributed around the periphery, which snap into an annular groove of the piston when the latter is located in its central position, and are retained in a blocked state by a blocking sleeve in their engaged position. The blocking sleeve is preloaded in the direction of its blocking position by a spring and can be moved by means of a separate pressure chamber hydraulically against the force of the spring in its unblocking position, in which it releases the blocking spheres, or retained in this position. In the event of a pressure loss, moreover, the valve is opened by the blocking sleeve, which creates a direct connection between the cylinder chambers, so that the piston can move freely. A disadvantage with the mechanical blocking device is that the latter is susceptible to wear, since the piston is held solely by the blocking spheres in the central position when the steering fails. If the steering fails, it is also not ensured that the steering can only move in the direction of the central position. Moreover, the blocking device tends to jam when, after an unblocking, the blocking spheres are not yet fully released and a hydraulic pressure is already present on the steering cylinder.

SUMMARY

The object of the invention consists in specifying a hydraulic rear axle steering, with which on the one hand a secure failure position is achieved and can be securely maintained even with the complete loss of the hydraulic medium, and which on the other hand avoids the drawbacks of the known mechanical blocking device.

This objective is met by the use of one or more of the features described herein. Advantageous embodiments can be taken the description and claims.

In the case of a steering system of the type mentioned at the outset, provision is made according to the invention such that a return line from each of the two working chambers leads to a tank and a hydraulically unblockable valve, in particular a load safety valve, is arranged in each of the return lines, that the hydraulically unblockable valves are constituted as admission-pressure controlled valves, the control connection of which is connected in each case to a pressure line leading from a pump to the respective other working chamber, and that the hydraulically actuated actuator is adjusted such that, when a first pressure value is applied, the locking element moves into the unblocking position and the admission-pressure controlled valves are adjusted such that, when a second pressure value is applied, they open at the control connection, wherein the second pressure value is higher than the first pressure value.

The load safety valves blocked in the case of a fault contribute to the fact that the steering cylinder is not only mechanically, but also hydraulically blocked after reaching the central position, so that the forces acting on the steering do not have to be borne by the mechanical blocking device alone. In addition, there is a redundancy due to the mechanical and hydraulic blocking of the steering cylinder, which contributes to increased safety against failure of the steering, i.e. in the case of failure, the steering at all events goes into a safe failure state. Finally, by means of the staggered switching pressures, with which the hydraulically actuated actuator and the load safety valves switch, a situation is achieved such that, after unblocking of the steering, the mechanical blocking device is first reliably unlocked, before the movement of the piston can start by opening of one of the load safety valves. The risk of jamming of the mechanical blocking device on account of a piston being under pressure is thus reduced. Insofar as an overpressure protection is intended to be dispensed with, which involves a load safety valve, hydraulically unblockable non-return valves can also be used in the place of load safety valves.

The blocking device of the steering system comprises at least one blocking member, which in the blocked state is retained by a locking element in an engaged position, and the locking element is adjustable by means of an actuator actuated hydraulically separate from the piston and piston rod between a blocking position, in which the locking element holds the blocking member in the engaged position, and at least one first unblocking position, in which the locking element releases the blocking member.

The actuator for actuating the locking element is an additional component separate from piston and piston rod of the steering cylinder, which however can preferably be integrated into the steering cylinder. The locking element is also a separate component separated from the function of the steering cylinder, but preferably integrated into the latter, which can preferably be adjusted independently of the piston rod, but preferably only in its central position.

The steering can preferably comprise a shut-off valve that can be opened without current and is constituted as a solenoid valve, which in the normal operation of the rear axle steering blocks a hydraulic connection between the working chambers or to a tank return line and is switched without current to deactivate the rear axle steering or in the event of a fault and releases the unidirectional hydraulic connection between the working chambers and the tank return line.

The shut-off valve can on the one hand be switched via a control device without current and therefore opened for the deactivation, when a deactivation of the rear axle steering is desired for example at higher speeds. On the other hand, the safety circuit for centring the rear axle steering in the event of a defect, which leads to a failure of the power supply, is automatically activated, in that the shut-off valve automatically opens.

Furthermore, it is advantageous if the blocking member of the blocking device engages with play with a recess, which forms the engaged position for the blocking member, in that the recess has an oversize compared with the blocking member. The oversize is dimensioned such that a steering angle resulting due to the oversize is smaller than a pre-defined maximum permissible angular error. For example, an angular error of +/−1° in the event of a fault can be tolerated for the wheel position of the steered rear axle, which does not have a persisting negative effect on the controllability of the vehicle. Resulting from the angular error and the kinematics via which the steering cylinder is connected to the axle, an associated axial play of the blocking member in the engaged position of for example 2 mm arises resulting from the tolerable angular error on the wheel.

The advantage of a certain amount of play in the engaged position consists in the fact that the steering during the assembly of the vehicle first only has to be roughly pre-set mechanically. The precise straight-ahead position, which is determined by an axle measurement, can be stored as an associated piston position in a control device of the steering system, i.e. an adjustment of the directional stability of the steering can take place purely by means of software. The rough adjustment of the steering during the assembly needs to be sufficiently accurate, so that the piston position, which corresponds to the directional stability, lies inside the play in the engaged position.

The blocking device explained above for the mechanical blocking with play can be used in combination with hydraulic blocking of the steering cylinder in principle independently of the staggering of the switching pressures claimed here, with which the hydraulically actuated actuator and the load safety valve switch, and therefore represents an independent invention. For example, it can be ensured in a different manner than by staggering of the switching pressures that the mechanical blocking device is unblocked, before a hydraulic control of the steering cylinder takes place, for example in that the blocking device is actuated by an (electrical or hydraulic) actuator independently of the hydraulics of the steering system and unblocking is secured by the control device.

In a preferred embodiment, moreover, the steering comprises at least one mechanically switchable valve, which is coupled mechanically with the locking element or the piston rod. Depending on the position of the locking element or the piston rod, a flow of hydraulic agent can be guided with such a valve between the working chambers of the steering cylinder or from the working chambers of the steering cylinder to a tank.

If the steering cylinder is constituted as a synchronizing cylinder, a return to the central position can take place, in that hydraulic fluid is conveyed via a preferably unidirectional connection between the working chambers directly from the one into the other working chamber. A return position of the piston into the central position can alternatively also be implemented by a discharge of one of the working chambers towards the tank. In this case, the steering cylinder can also be constituted as a differential cylinder.

In a first embodiment, provision can be made such that the mechanically switchable valve is constituted as a switch-over valve with three switching positions, between which it is switched via a modified region of the piston rod depending on the piston position, wherein the valve in a first switching position connects the one of the working chambers to the tank return line, in a second switching position blocks the connection between the two working chambers and the tank return line and in a third switching position connects the other working chamber to the tank return line.

If one of the working chambers is discharged to the tank for the deactivation, the piston can enter the respective working chamber and displace the hydraulic fluid present there. In the other working chamber, hydraulic fluid can be sucked out of the tank, in particular via a further non-return valve blocking towards the tank, in order to compensate for an under-pressure otherwise occurring in the working chamber. The line leading to the tank with the non-return valve blocking towards the tank can in particular emerge into a pressure line leading to the pump, by means of which hydraulic agent would also be conveyed in the direction of the respective tank with the corresponding steering operation.

In this way, depending on the deflection of the piston rod, it can be ensured that the piston can be moved only in the direction of the central position. The second switching position is occupied in the middle position, in which none of the working chambers is discharged towards the tank return line, so that the steering cylinder remains hydraulically blocked.

In another embodiment, the valve arrangement comprises two mechanically switchable valves, in particular mechanically unblockable non-return valves, wherein the locking element can be moved between the first unblocking position, the blocking positions and a second unblocking position and a first of the valves is switched by the actuator when the locking element is moved into the first unblocking position and a second of the valves is switched by the actuator when the locking element is moved into the second unblocking position.

In this way, the control of a valve arrangement can be implemented which, depending on the steering position of the steering cylinder, switches a unidirectional hydraulic connection between the working chambers of the steering cylinder, in such a way that the piston is likewise able to move only to its central position. An integration of the valves can preferably take place in an end piece of the steering cylinder.

Provision can also be made such that the valve arrangement comprises two optional unblockable (non-return) valves, which are each arranged in a discharge line leading from each respective one of the working chambers to the tank. In this case, the valve arrangement brings about an optional actuation of the discharge lines.

It is particularly preferable here if the mechanically unblockable non-return valves are integrated structurally into the steering cylinder. This leads not only to a particularly compact design, but also increases the safety against failure, since the sensitive valves are integrated in the steering cylinder are protected against external mechanical influences and the penetration of moisture and dirt and furthermore the function remains secure even if the hose connection between the steering cylinder and the pressure supply unit fails.

The discharge lines can preferably lead to the shut-off valve and from there to the tank. The discharge lines can in particular be connected to the shut-off valve by non-return valves opening in the direction of the tank or via a shuttle valve. These prevent the hydraulic fluid from being able to flow from one working chamber in the direction of the other working chamber instead of to the tank. In other words, the non-return valves or a shuttle valve ensure that there is no direct connection between the working chambers.

Within the scope of the invention, provision is expediently made such that the locking element is spring-loaded in the direction of its blocking position by means of one or more return springs. Without an external force of an actuator or in the event of failure thereof, the locking element thus returns into its blocking position automatically under the effect of the return spring(s) when the piston reaches the central position, in which the blocking member is retained in the engaged position and the piston is thus blocked in the central position.

A movement of the locking element outside the central position can in principle take place by any kind of latching or catch mechanism and can be independent of the position of the blocking member, which engages the piston in its central position. In a preferred embodiment of the invention, provision is however made that a movement of the locking element outside the central position of the piston is blocked by the blocking member located in its position releasing the piston. Blocking of the locking element outside the central position thus takes place by the same latching mechanism, which blocks the piston in the central position.

In a preferred embodiment, the piston rod comprises a hollow space extending through the piston and the blocking device is arranged inside the hollow space of the piston rod. On the one hand, this results in a particularly compact design, on the other hand the blocking device is protected against external influences and soiling, as a result of which the steering cylinder can be constituted particularly robust.

In particular, an internal pipe projecting from an end piece of the steering cylinder into its cylinder space can be provided, which extends into the hollow space of the piston rod.

The locking element can be constituted as a longitudinally movable sleeve inside the internal pipe, which in an end region bears an annular bead serving as a locking notch, which in the blocking position retains the at least one blocking member in the engaged position.

In principle, different kinds of blocking bodies can be used as blocking members, such as for example latches, catches, rolls, segmented bodies, wedges, etc. and are included within the scope of the present invention.

In a further preferred development, a plurality of spring tongues arranged distributed around the periphery serve as blocking members, which at their end each carry a snap-in nose, which engages in a recess, in particular an annular groove at the inner side of the hollow space of the piston rod. The spring tongues can be arranged in particular at the end of the said internal pipe projecting into the cylinder space and together with the latter form a type of collet.

In an alternative embodiment, a plurality of blocking spheres arranged distributed around the periphery serve as blocking members, which engage in an annular groove on the inner side of the hollow space of the piston rod. The embodiment of the blocking device as a sphere locking mechanism leads to a particularly robust arrangement, in which in particular malfunctions due to jamming of individual blocking members are largely excluded.

Furthermore, it is advantageous if the load safety valves are additionally constituted as overpressure valves, which open when a maximum pressure value present at a medium connection connected to the respective working chamber is exceeded, wherein the maximum pressure value lies above the first and the second pressure value. Dangerous pressure conditions in the steering system, which could lead to damage or failure, are thus prevented. A dangerous overpressure can occur for example on account of the force exerted by the wheels on the steering cylinder in the event of a hard curb stone contact. The overpressure relief via the load safety valves protects the mechanics of the axle and the mechanics of the steering cylinder and thus the entire hydraulic steering against damage due to overloading. This is the advantage compared to the alternatively constituted, hydraulically unblockable non-return valves, which otherwise enable an identical function of the system with the exception of an overpressure relief.

In another preferred embodiment, the pump, with which the working chambers of the steering cylinder are pressurized optionally with a hydraulic medium for the purpose of deflecting the piston in the one or the other direction, is constituted as a reversible pump, which is driven in the opposite direction of rotation in order to deflect the piston in different directions. The steering cylinder can thus be controlled by a simple reversal of the direction of rotation, so that additional expensive switch-over valves for the control of the fluid flow can be dispensed with.

Within the scope of the invention, a control device can expediently be used to control the pump and the valve arrangement. Here, it is particularly advantageous with the aforementioned sphere locking mechanism if the control device is constituted such that the hydraulic medium flow from the pump is briefly throttled or stopped during the implementation of a steering movement over the central position of the steering cylinder when the central position is reached.

It is thus ensured that the blocking members, which apart from the central position block the movement of the locking elements, are given sufficient time in the central position to escape into their engaged position in which the piston is blocked, but a movement of the blocking member is however released. A malfunction due to jamming or restraint of the blocking members is thus prevented.

BRIEF DESCRIPTION OF THE DRAWINGS

Further advantages and embodiments of the invention emerge with the aid of the following description of examples of embodiment with the aid of the figures. They show.

DETAILED DESCRIPTION

Figure 1:
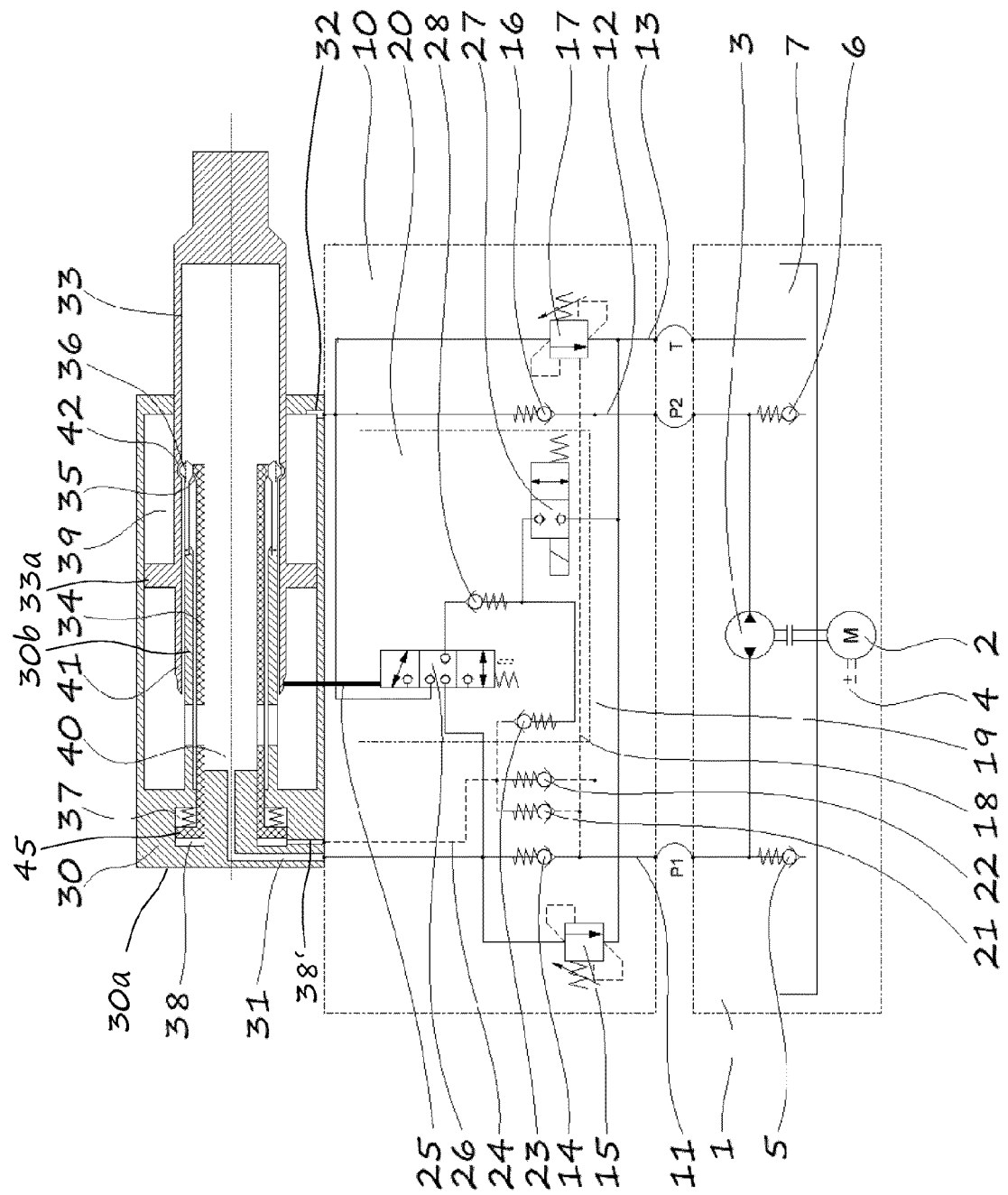
FIG. 1: a first example of embodiment of the steering system in the state blocked in a central position.
Figure 2:
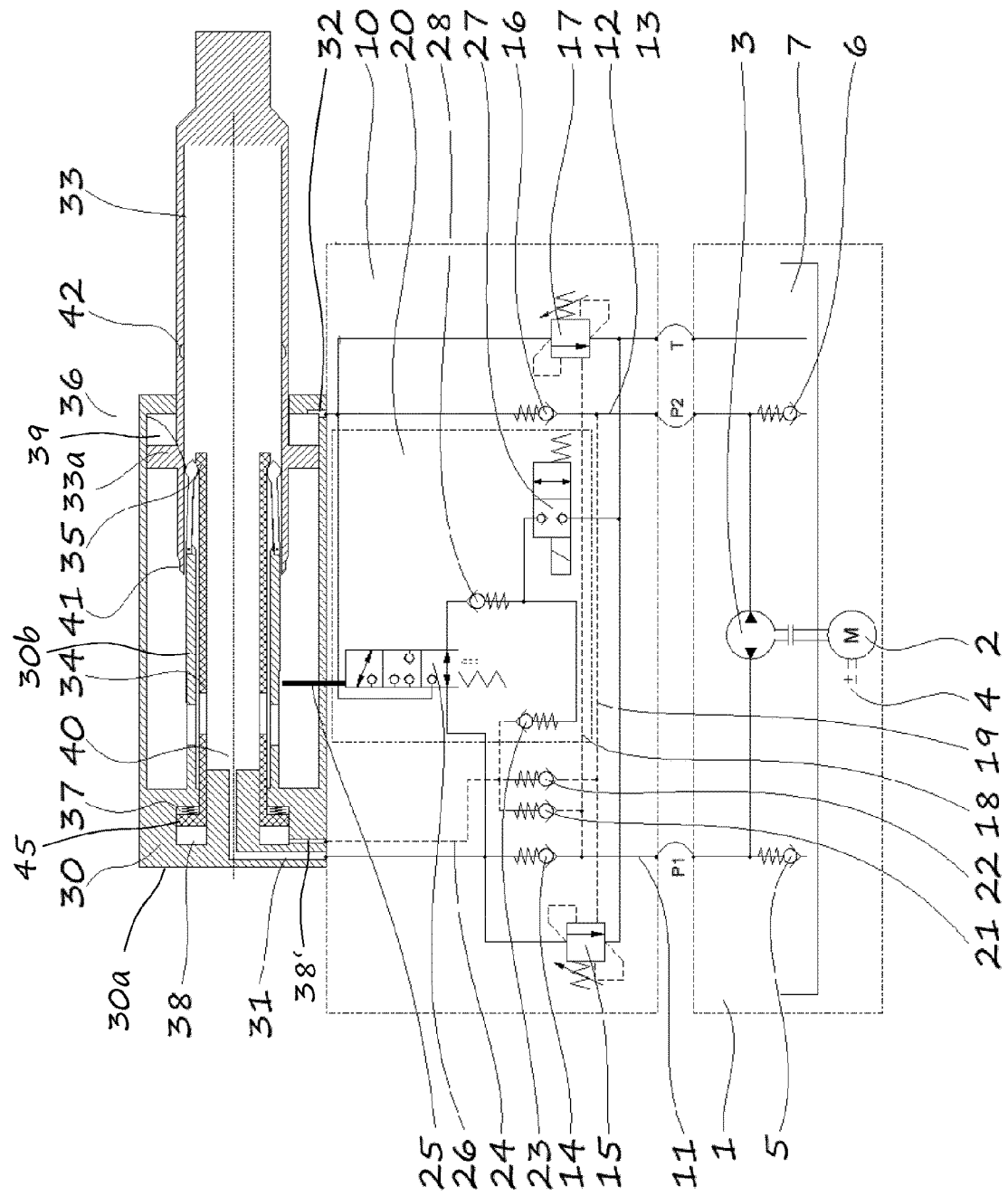
FIG. 2: the steering system from FIG. 1 in a steering position with an extended piston rod.
Figure 3:
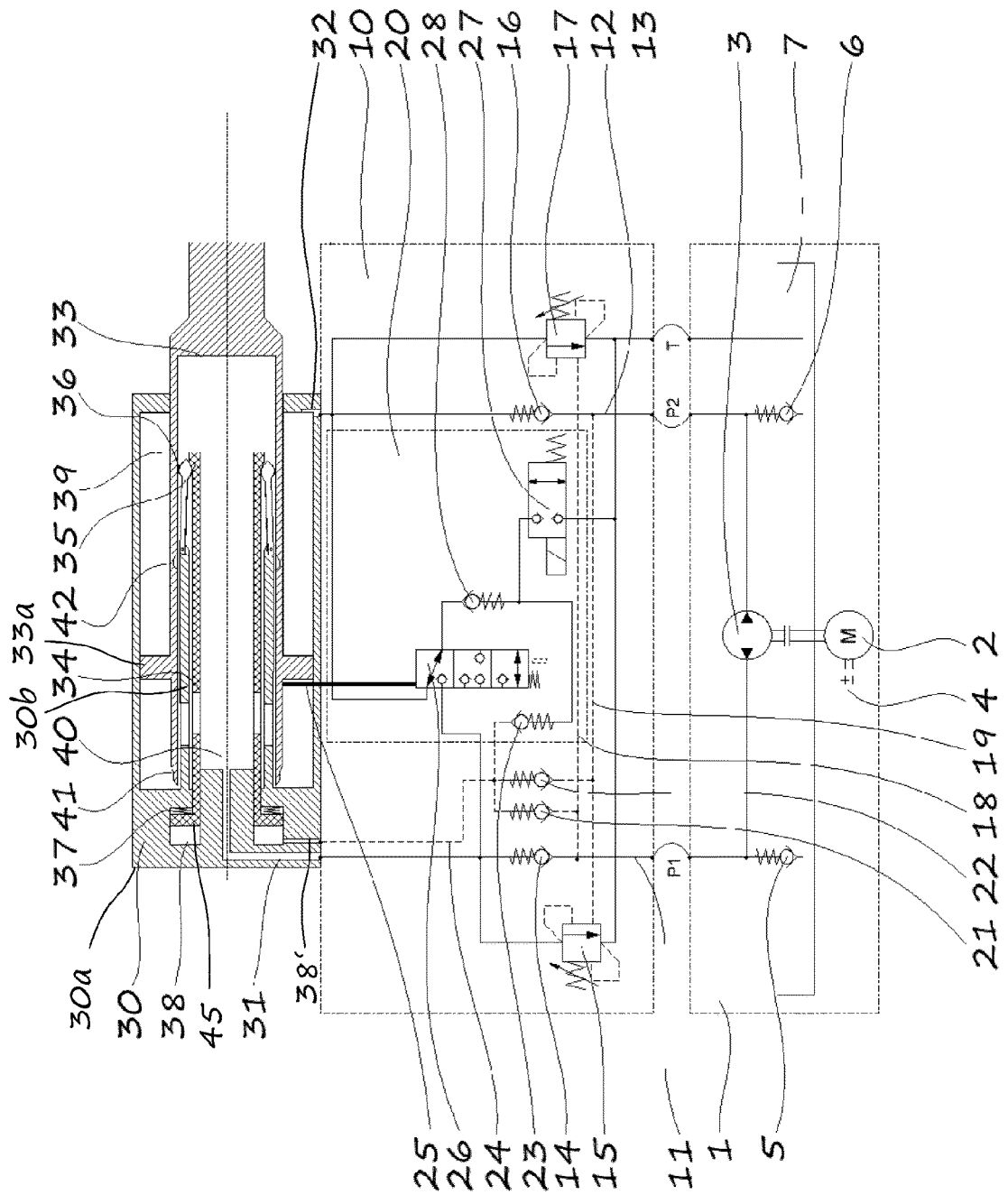
FIG. 3: the steering system from FIG. 1 in a steering position with a retracted piston rod.

A first example of embodiment of a rear axle steering is represented diagrammatically in FIGS. 1 to 3. A pressure supply unit 1 has a valve block 10, which in turn contains a safety circuit 20, a steering cylinder (hydraulic cylinder) 30 with hydraulic oil. Pressure supply unit 1 comprises a reversible pump 3, which is driven by an electric drive motor 2. Electrical connection 4 of drive motor 2 is controlled by a control device not represented in FIG. 1. Depending on the control of drive motor 2, the latter rotates pump 3 in the one or other direction.

Pump 3 has two hydraulic connections, which operate optionally as a suction connection or as a pressure connection depending on the direction of rotation. The hydraulic connection, which in each case works as a suction connection, sucks via corresponding non-return valve 5, 6 hydraulic agent out of tank 7, which is conveyed via the respective other hydraulic connection of pump 3 in the direction of the connected consumer, i.e. here steering cylinder 30.

The hydraulic lines coming from pump 3 are connected via connections P1, P2 to valve block 10. Each of connections P1, P2 leads in each case via a hydraulic line, pressure lines 11, 12, and a non-return valve 14, 16 to one of pressure connections 31, 32 of steering cylinder 30. In the return direction, each of pressure connections 31, 32 of steering cylinder 30 is connected via a load safety valve 15, 17 to a tank return line 13, which leads back to tank 7. Load safety valves 15, 17 are admission-pressure controlled valves, the control inlet of which is connected via pilot lines 18, 19 via a cross to respective other pressure line 11, 12.

Steering cylinder 30 comprises a cylinder chamber with a piston 33a arranged longitudinally mobile therein, which passes over into a piston rod 33. Piston 33a is sealed with respect to the cylinder wall of the steering cylinder 30. A corresponding piston seal of a known design is not represented here to allow better clarity. Ein internal pipe 30b extends from an end piece 30a of steering cylinder 30 into the cylinder space. Piston 33a and piston rod 33 have a hollow space, into which internal pipe 30b projects. The hollow space bounded by the cylinder wall of steering cylinder 30 and piston rod 33 forms a first working chamber 39 of steering cylinder 30, the annular chamber. The hollow space bounded by the cylinder wall and the piston on the side facing away from the piston rod forms together with the hollow space in the interior of the piston rod a second working chamber 40 of the steering cylinder 30, the piston chamber. Internal pipe 30b comprises for this purpose passages in order to enable an unhindered fluid balance inside the piston chamber. In this example of embodiment, the two working chambers 39, 40 have hydraulically effective surfaces which differ in size, so that the steering cylinder 30 is constituted as a differential cylinder.

Piston 33a can be moved to the left or right by the application of pressure on one of working chambers 39, 40, as a result of which the piston rod 33 is retracted or extended. A first pressure connection 31 in end piece 30a of steering cylinder 30 runs axially through internal pipe 30b into working chamber 40. A second pressure connection 32 is arranged in the region of a guide piece of steering cylinder 30 surrounding piston rod 33 in a sealing manner and is connected to working chamber 39.

A particular technical feature of steering cylinder 30 forms a mechanical blocking device, which engages and therefore blocks the piston 33a in a central position, i.e. a position which corresponds to the straight-ahead position of the rear axle steering, inside steering cylinder 30. For this purpose, a blocking sleeve 34 mobile in the axial direction lies inside internal pipe 33b. The latter carries in an end region an annular bead 35 serving as a locking notch. A plurality of spring tongues arranged peripherally distributed around blocking sleeve 34 serve as blocking members, which in each case carry a snap-in nose 36 at their end, which engages in an annular groove 42 on the internal side of the hollow space formed in piston rod 33. In the axial direction, blocking sleeve 34 engages with annular bead 35 via snap-in noses 36 arranged in the end region of internal pipe 30b and annular groove 42 formed at the internal wall of hollow piston rods 33. In FIG. 1, snap-in noses 36 are shown in their engaged position, wherein annular bead 35 prevents the spring tongues from being able to escape inwards. Annular bead 35 thus holds snap-in noses 36 in their engaged position and as a locking element ensures that piston 33a is blocked.

The spring tongues and snap-in noses 36 are connected in one piece with internal pipe 30b and form a kind of collet chuck, which is in turn connected, in particular welded, to end piece 30a of steering cylinder 30, or constituted as a forged part. If snap-in noses 36 are engaged in annular groove 42 of piston rod 33, there is thus a rigid, mechanical connection between both end linkage points of the steering cylinder 30.

In the example of embodiment, the annular groove 42 is constituted 2 mm wider than the width of snap-in nose 36, so that the latter in the engaged position are engaged with play of 2 mm with the annular groove. The 2 mm play corresponds here roughly to a steering angle of 0.5° on the wheels of the rear axle.

The steering can thus first be roughly adjusted during the assembly of the vehicle, so that the wheels are roughly in a straight-ahead direction and snap-in noses 36 are engaged in an annular groove 42. An axle measurement then takes place, by means of which the exact straight-ahead position of the wheels is determined. This corresponds to a piston position of the steering cylinder (zero position) and can be stored using software in the control device of the steering system, i.e. an adjustment of the directional stability of the steering can take place purely using software. In the operation of the steering system, a steering deflection is controlled from the control device from the zero position stored in the software. In the event of a fault, the blocking device blocks in the central position, which at least roughly corresponds to the straight-ahead position. The angular error resulting on account of the play in the engaged position lies within the acceptable tolerance range, which can amount for example to +/−1°.

In order to initiate a movement of piston 33a, the blocking device has to be unblocked. For this purpose, the blocking sleeve 34, which serves as an adjustment element for the locking latch formed by the annular bead 35, is moved to the right in FIG. 1, so that the spring tongues can spring inwards and the snap-in noses 36 can escape inwards out of the blocking position. The situation is shown in FIG. 2 that blocking sleeve 34 is moved to the right into its unblocking position for the extension of piston rod 33, so that the snap-in noses 36 can escape inwards. Since snap-in noses 36 no longer engage in annular groove 42, piston 33a could be moved to the right in the plane of the drawing by pressurisation of working chamber 40 and piston rod 33 can thus be extended. In FIG. 3, the reverse situation is shown, in which the blocking sleeve 34 set in its unblocking position has released snap-in noses 36 inwards and piston rod 33 has been moved to the left by pressurisation of working chamber 39.

As soon as piston 33a has been moved out of its central position in the one or other direction, blocking sleeve 34 can no longer be moved back into its blocking position, since snap-in noses 36 no longer escape outwards into annular groove 42 and annular bead 35 can no longer be pushed over snap-in noses 36. As long as piston 33a is not in the central position, blocking sleeve 34 can consequently no longer be moved.

The actuation of blocking sleeve 34 and therefore unlocking of piston 33a takes place by means of an admission-pressure controlled actuator, which is integrated into end piece 30a of steering cylinder 30. The actuator is formed by a pressure chamber 38 and a spring chamber 37, which are separated by an auxiliary piston 45 mounted mobile. Pressure chamber 38 can be pressurised with a control pressure by means of control connection 38', in order to move auxiliary piston 45 to the right. Auxiliary piston 45 is in turn connected by blocking sleeve 34 in order to move the latter into its unblocking position. A return spring inside spring chamber 37 ensures that auxiliary piston 45 in the pressure-less state experiences a return force to the left. As soon as piston rod 33 reaches its central position and snap-in noses 36 engage with annular groove 42 and thus release the locking latch 35, auxiliary piston 45 is moved to the left under the force effect of the return spring and blocking sleeve 34 is thus led into its blocking position.

If, proceeding from the central position shown in FIG. 1, a deflection of the piston to the right for the extension of piston rod 33 takes place, pressure is built up in pressure line 11 via pump 3 by a corresponding activation of electric motor 2, which is connected via a non-return valve 14 to pressure connection 31, which leads to working chamber 40. Before non-return valve 14, a control line 18 branches off, which on the one hand is connected via non-return valve 21 to control connection 38', on the other hand to the control connection of load safety valve 17, which is located in tank return line 13 leading from opposite working chamber 39 to tank 7. After a preliminary pressure is built up in line 18, the actuator first moves auxiliary piston 45 and thus blocking sleeve 34 to the right by pressurisation of pressure chamber 38, so that snap-in noses 36 can escape inwards. The blocking device thus releases piston 33a, so that piston 33a can be moved to the right by pressurisation of working chamber 40 and piston rod 33 can be extended. The corresponding state is represented FIG. 2.

In the reverse case, in which piston rod 33 is to be retracted, hydraulic pressure is built up in pressure line 12 via pressure supply unit 1. Pressure is thus built up in pressure chamber 38 of the actuator via the admission-pressure line 19 and non-return valve 22, so that auxiliary piston 45 and with it blocking sleeve 34 are again moved to the right and snap-in noses 36 are unblocked. By means of the preliminary pressure in line 19, moreover, load safety valve 15 is unblocked, so that hydraulic fluid can be displaced out of working chamber 40 into tank 7. After non-return valve 16 opens, hydraulic pressure builds up in working chamber 39, so that the piston rod 33 retracts.

The preliminary pressures, at which the actuator switches and load safety valves 15, 17 open, can be adjusted such that in turn an unblocking of the blocking device first takes place and then load safety valves 15, 17 of opposite working chamber 40, 39 is opened. For example, the hydraulic steering can be designed for a maximum hydraulic pressure of 200 bar. For example, provision can be made such that the actuator is deflected with a preliminary pressure of 20 bar at connection 38' and the blocking device is thus unblocked. This is achieved by a suitable selection of the spring force of the return spring in spring chamber 37. With a preliminary pressure of 40 bar for example, opposite load safety valve 15, 17 opens, so that piston 33a of unblocked steering cylinder 30 is deflected.

Load safety valves 15, 17 also operate as overpressure valves, in that they open with pressure peaks of over 200 bar in one of working chambers 39, 40 and relieve the overpressure in the direction of tank 7. Such an overpressure can occur for example on account of the force exerted by the wheels on steering cylinder 30 in the event of a hard contact with a curb stone. The overpressure relief via the load safety valves 15, 17 protects the hydraulic steering against damage due to overload.

In the event of a defect, a deactivation of the rear axle steering and centring in a straight-ahead position has to take place. Also with rapid travel forwards, it can be advantageous to deactivate the rear axle steering and to lock it in the central position, in order to stabilise the driving behaviour of the vehicle at high speeds. Safety circuit 20 serves this purpose, the function of which is explained below with the aid of the figures.

Safety circuit 20 enables an alternative discharge of one of working chambers 39, 40 towards tank 7. Safety circuit 20 comprises a switch-over valve 26 with three switching positions. In the lower valve position shown in FIG. 2, switch-over valve 26 connects hydraulic connection 31 and therefore working chamber 40 of steering cylinder 30 via shut-off valve 27 and a further non-return valve 28 to tank return line 13. In this switching position, which is occupied with piston rod 33 extended in respect of the central position, hydraulic fluid can thus escape from working chamber 40 in the direction of tank 7 with an open shut-off valve 27 in the event of a failure of the steering system, so that piston rod 33 can retract in the direction of its central position.

In the top switching position shown in FIG. 3, switch-over valve 26 connects hydraulic connection 32 and therefore working chamber 39 of steering cylinder 30 via shut-off valve 27 and non-return valve 28 to tank return line 13. In this switching position, which is occupied by piston rod 33 retracted in respect of the central position, hydraulic fluid can thus escape from working chamber 39 in the direction of tank 7 with an open shut-off valve 27 in the event of a failure of the steering system, so that piston rod 33 can extend in the direction of its central position.

In the middle switching position shown in FIG. 1, switch-over valve 26 is blocked, so that hydraulic fluid cannot escape from any of working chambers 39, 40, i.e. steering cylinder 20 is hydraulically blocked in the event of failure or deactivation of the steering system. Thus, despite the previously explained small amount of play in the mechanical blocking device, as long as no loss of the hydraulic fluid occurs, steering cylinder 30 cannot be moved, since as stated it is additionally hydraulically blocked.

By means of switch-over valve 26, it is thus ensured that via safety circuit 20 it is always the case that only a return movement of piston 33a into its central position is released. The activation of safety circuit 20 takes place via shut-off valve 27 which is opened without current, which in the normal operation, i.e. when current is supplied, blocks the fluid path switched by switch-over valve 26 in the direction of tank return line 13.

In the event of a fault, i.e. with an opened shut-off valve 27, it is technically not possible (even with a maximum volume flow from motor pump unit 1) for a pressure to be built up in the system, with which the first or second pressure stage of the actuator or load safety valves 15, 17 would be reached. It is thus ensured that no undesired steering movement can be initiated in the event of a defective activation of motor 2.

A further non-return valve 23, which is also connected by shut-off valve 27 to tank return line 13, ensures that, when shut-off valve 27 is open, i.e. when safety circuit 20 is activated, pressure chamber 38 of the actuator is discharged to tank 7, so that when the central position is reached the return spring in spring chamber 37 moves blocking sleeve 34 to the left into its blocking position and thus blocks piston 33a mechanically in its central position. It is thus ensured that, in the event of a failure of the steering, the steering cylinder is blocked both mechanically and also hydraulically, so that the safe failure state is achieved and is kept redundant, i.e. both with the loss of hydraulic fluid, i.e. also with a mechanical failure of the blocking device.

The following should be taken into account for the locking. As long as shut-off valve 27 is closed, i.e. as long as this solenoid valve 27 remains supplied with current, auxiliary piston 45 is always preloaded with maximum pressure, which has arisen since the last blocking. Only by opening of shut-off valve 27 is the pressure released from pressure chamber 38 of auxiliary piston 45 towards tank 7, as a result of which the spring force of the return spring generally acts on blocking sleeve 34.

The actuation of switch-over valve 26 takes place by means of piston rod 33 and more precisely by a region 41 modified in the peripheral direction, which is scanned by means of a scanner 25 which in turn actuates switch-over valve 26. In the example of embodiment, internally hollow piston rod 33 is extended for this purpose beyond piston 33a into working chamber 40 and engages round internal pipe 30b. Towards its end, the external diameter of extension 41 of piston rod 33 is reduced. This corresponds to the central position of piston 33a shown in FIG. 1, i.e. when scanner 25 is present at the taper of extension 41 of piston rod 33, switch-over valve 26 is in the central position, in which the switch-over valve 26 blocks.

In FIG. 2, piston rod 33 is extended and scanner 25 lies beyond the end of extension 41 of the piston rod, so that the latter can be extended further. Correspondingly, scanner 25, when it reaches the end of extension 41, switches switch-over valve 26 into the lower switching position, in which it connects pressure connection 31 leading to working chamber 40 via shut-off valve 27 to tank return line 13. When shut-off valve 27 is opened, i.e. when safety circuit 20 is activated, hydraulic fluid can thus be displaced from working chamber 40 to tank 7, so that piston rod 33 can retract in the direction of its central position, until switch-over valve 26 blocks when it reaches the central position (FIG. 1).

Finally, piston rod 33 is retracted in FIG. 3. Scanner 25 lies in the region of extension 41 of piston rod 33 and thus pushes scanner 25 so far that switch-over valve 26 is switched into its upper switching position, in which switch-over valve 26 connects pressure connection 32 leading to working chamber 39 via shut-off valve 27 to tank return line 13. When shut-off valve 27 is opened, hydraulic fluid can thus be displaced out of working chamber 39 to tank 7, so that piston rod 33 can extend in the direction of its central position, and again for so long until switch-over valve 26 blocks when it reaches the central position (FIG. 1).

The safety circuit is not limited to the use of a switch-over valve. On the contrary, other valve circuits can be used, with which either a connection between respectively one working chamber 39, 40 and the tank is switched, or with which a preferably unidirectional connection between the working chambers 39, 40 is switched in the case of a synchronizing cylinder. Thus, for example, instead of switch-over valve 26, two shut-off valves, preferably mechanically unblockable non-return valves, are used, of which one is opened in each case. The activation of the shut-off valves can take place via piston rod 33, which in this case comprises a modified region for each of the shut-off valves, which is scanned by an associated scanner and in each case switches one of the shut-off valves. It is also possible that the activation takes place via blocking sleeve 34, which in this case acts as a switching element, as it were.

Figure 4:
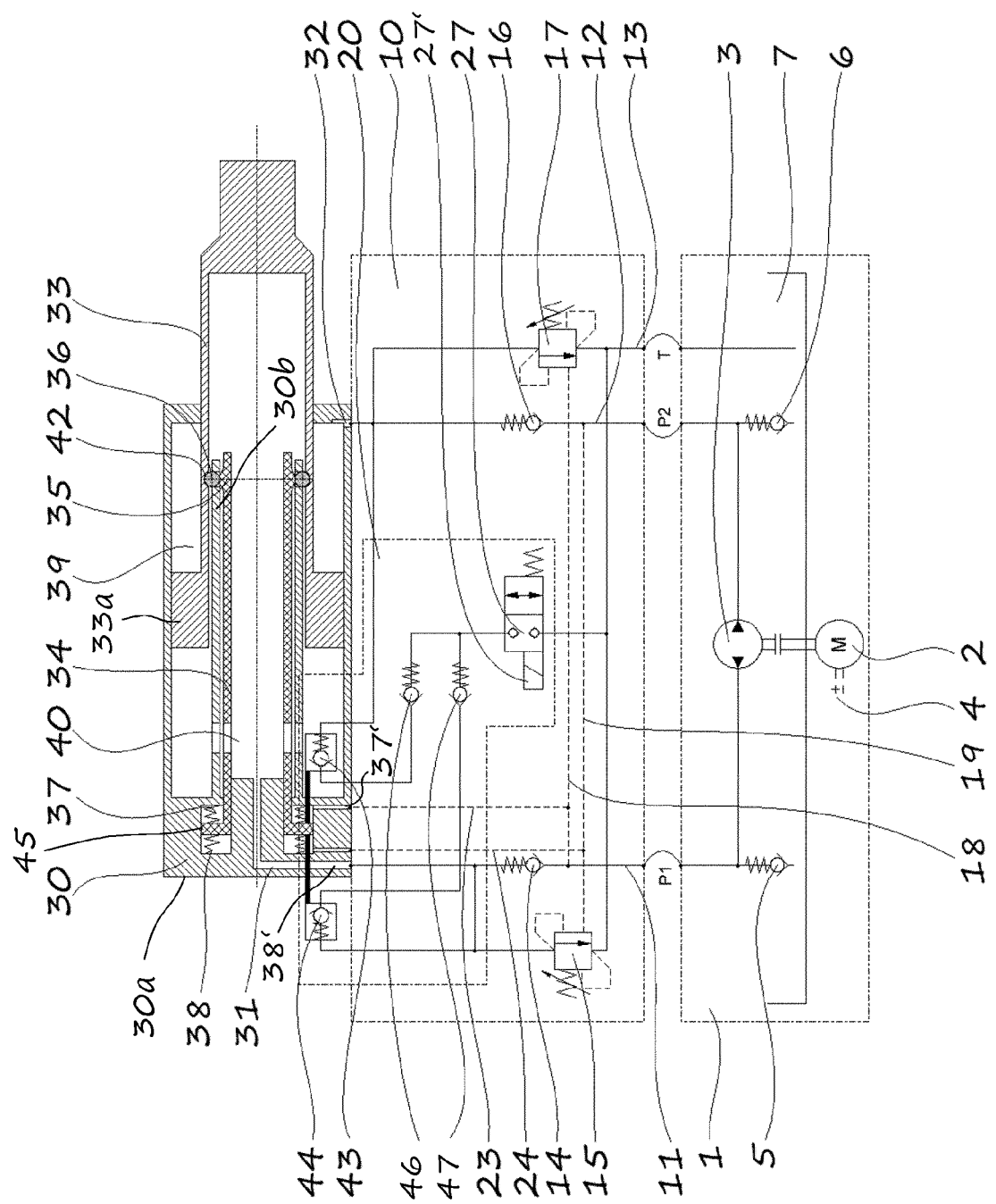
FIG. 4: a second example of embodiment of the steering cylinder with the associated valve switch in a state blocked in the central position.
Figure 5:
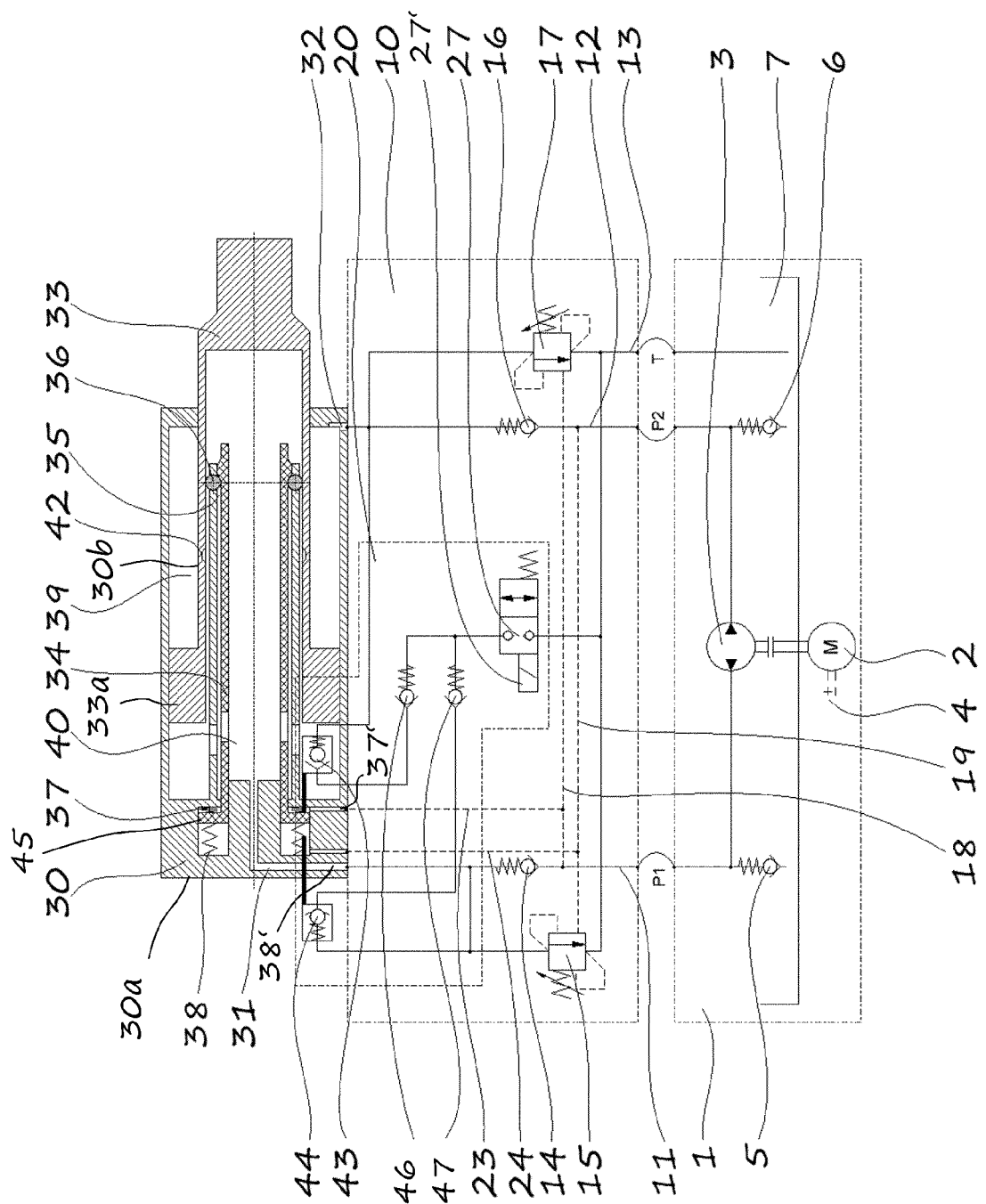
FIG. 5: the steering cylinder from FIG. 4 in a steering position with a retracted piston rod.
Figure 6:
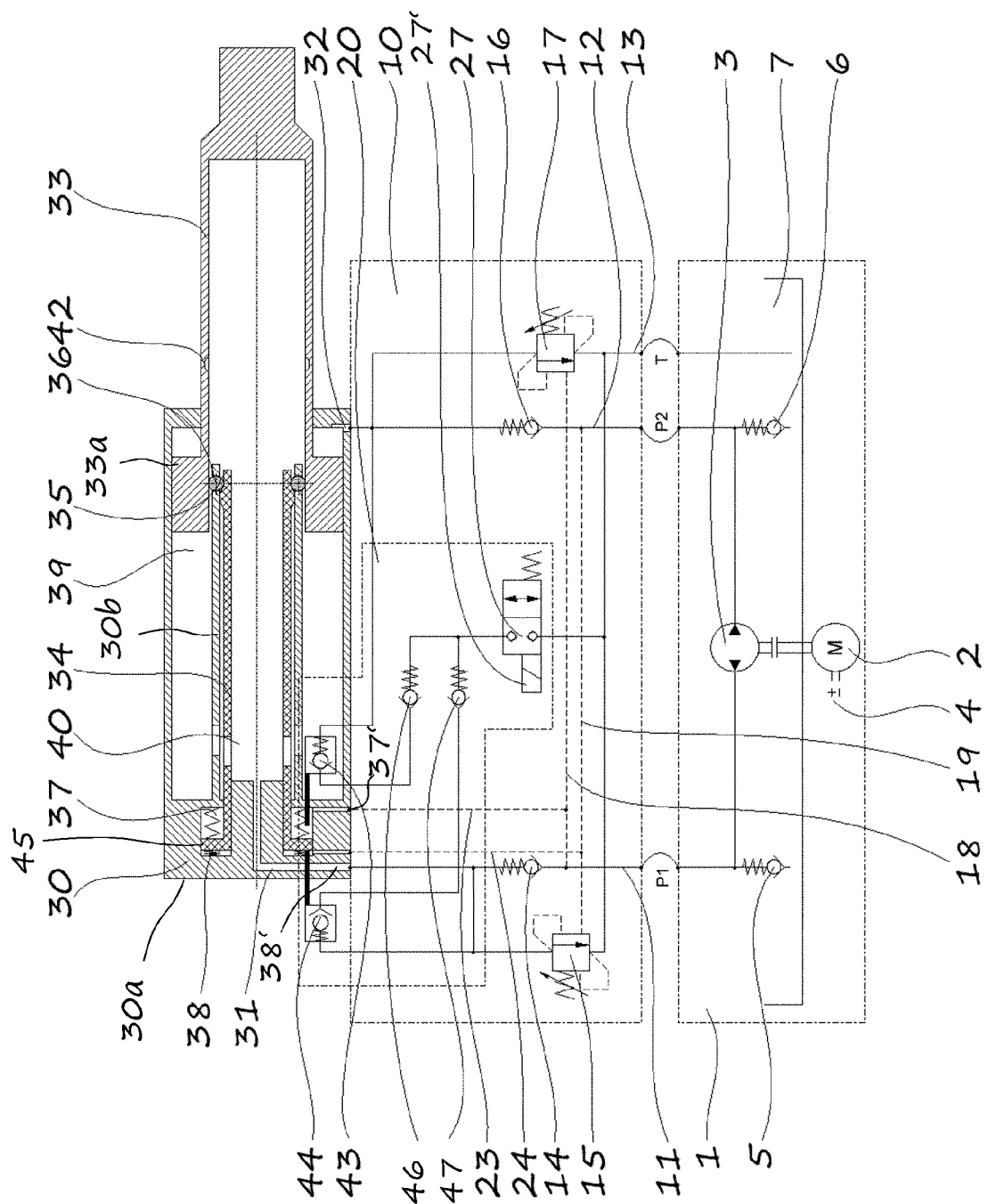
FIG. 6: the steering cylinder from FIG. 4 in a steering position with an extended piston rod.

A second example of embodiment is represented in FIGS. 4 to 6, in which two mechanically unblockable non-return valves 43, 44 are used instead of a switch-over valve. In this embodiment, blocking sleeve 34 has two unblocking positions and blocking spheres 36' act as blocking members, which engage in the annular groove 42 at the inner side of internally hollow piston rod 33 and are blocked by annular bead 35 at the end of blocking sleeve 34 in their blocking position.

In the second example of embodiment, the mechanical blocking device of steering cylinder 30, which blocks piston 33a in its central position, is constituted as follows. Blocking sleeve 34 movable in the axial direction lies inside internal pipe 33b. It again bears in the end region annular bead 35 serving as a locking latch. A series of blocking spheres 36' arranged distributed around blocking sleeve 34 serve as blocking members, which snap into annular groove 42 in the inside of the hollow space constituted in piston rod 33. Blocking spheres 36' are accommodated with the radial play in the end region of internal pipe 30b. In the axial direction, blocking sleeve 34 engages with annular bead 35 in the sphere holder constituted in the end region of internal pipe 30b. In FIG. 4, blocking spheres 36' are shown in their engaged position, wherein annular bead 35 retains blocking spheres 36' in the engaged position and, as a locking element, thus ensure that piston 33a is blocked.

In order to initiate a movement of piston 33a, the blocking device must be unblocked. For this purpose, blocking sleeve 34 in FIG. 4 can be moved to the left or right, so that locking spheres 36' can escape from their blocking position either on the right-hand or the left-hand side of annular bead 35. In FIG. 5, the situation is shown that blocking sleeve 34 is moved to the left in the plane of the drawing for the retraction of piston rod 33, so that blocking spheres 36' can escape on the right-hand side of locking latch 35. Since blocking spheres 36' are no longer engaged in annular groove 42, piston 33a can be moved to the left in the plane of the drawing by pressurisation of working chamber 39 and piston rod 33 can thus be retracted.

In FIG. 6, the reverse situation is shown, in which blocking sleeve 34 has been moved to the right in the plane of the drawing, in order to extend piston rod 33 to the right. Blocking spheres 36' can thus escape on the left-hand side of locking latch 35 and release annular groove 42, so that piston rod 33 can be moved to the right.

It is essential here that, as soon as blocking spheres 36' have moved out of their blocking position, i.e. out of the engagement in annular groove 42, and piston rod 33 is no longer in its central position, locking latch 35 can be engaged in its position moved to the left or right, since the blocking spheres can no longer escape outwards in the region of annular groove 42. Consequently, blocking sleeve 34 can no longer be moved in this position. In the second example of embodiment, the deflection of blocking sleeve 34 mechanically stores the deflection state of steering cylinder 30. The deflection state of blocking sleeve 34 can thus be used to control safety circuit 20, which, through a discharge of one of working chambers 39, 40, serves to enable a return movement of piston 33a in the direction of its central position inside steering cylinder 30.

The actuation of blocking sleeve 34 and therefore unlocking of piston 33a takes place via an admission-pressure controlled actuator which is integrated into end piece 30a of steering cylinder 30. The actuator is formed by two pressure chambers 37, 38, which are separated by auxiliary piston 45 mounted movably. By means of suitable control connections 37', 38', pressure chambers 37, 38 can optionally be pressurised with a control pressure, in order to move auxiliary piston 45 in the one direction or the other. Auxiliary piston 45 is in turn connected to blocking sleeve 34, in order to move the latter into its first or second unblocking position. Return springs inside pressure chambers 37, 38 ensure that auxiliary piston 45 in the pressureless state experiences a return force in the direction of its central position. As soon as piston rod 33 reaches its central position and blocking spheres 36' are engaged with annular groove 42 and thus release locking latch 35, auxiliary piston 45 is moved into its central position under the force effect of the return springs. In addition, the position of auxiliary piston 45 can be monitored via a contactless sensor (48 in FIG. 7) and relayed to a control device.

If, proceeding from the central position shown in FIG. 4, a deflection of piston 33a to the left is to take place for the retraction of piston rod 33, pressure is built up in pressure line 12 via a corresponding actuation of electric motor 2 by means of pump 3, which leads via non-return valve 16 to pressure connection 32, which is connected to working chamber 39. Before non-return valve 16, a control line 19 branches off, which on the one hand is connected to control connection 37', and on the other hand to the control connection of the load safety valve 15, which is located in return line 13 leading from opposite working chamber 40 to tank 7. After a preliminary pressure has been built up in line 19, the actuator first moves auxiliary piston 45 and therefore blocking sleeve 34 to the left by pressurisation of pressure chamber 37, so that blocking spheres 36' can escape on the right-hand side of locking latch 35. The blocking device thus releases piston 33a, so that piston 33a can be moved to the left and piston rod 33 retracted by pressurisation of working chamber 39. The corresponding state is represented in FIG. 5.

In the reverse case, in which piston rod 33 is to be extended, hydraulic pressure is built up in pressure line 11 by pressure supply unit 1. Pressure is thus built up in pressure chamber 38 of the actuator via admission-pressure line 18, so that auxiliary piston 45 and with it blocking sleeve 34 is moved to the right. Blocking spheres 36' can thus escape on the left-hand side of locking latch 35. By means of the preliminary pressure line 18, moreover, the load safety valve 17 is unblocked, so that hydraulic fluid can be displaced from working chamber 39 into tank 7. After the non-return valve 14 is opened, hydraulic pressure builds up in working chamber 40, so that piston rod 33 extends.

The preliminary pressures, at which the actuator and load safety valves 15, 17 open, can be adjusted as in the first example of embodiment such that, in turn, unblocking of the locking device first takes place and then load safety valve 15, 17 of opposite working chamber 40, 39 is opened.

Safety circuit 20 serves for the alternate discharge of one of working chambers 39, 40 to tank 7. Safety circuit 20 comprises two non-return valves 46, 47 arranged in parallel line sections, which each open in the direction of tank 7, i.e. release a fluid flow to the tank 7. Non-return valve 27 opened without current is again arranged in series with the two non-return valves 46, 47 connected in parallel. Non-return valves 46, 47 prevent hydraulic fluid from flowing out of the one working chamber in the direction of the other.

Instead of two non-return valves 46, 47, a shuttle valve can also be used, via which the two discharge lines are connected to shut-off valve 27. A shuttle valve is a hydraulic valve with two inlets and one outlet. The shuttle valve represents the technical translation of a non-exclusive OR operation in the area of the hydraulics. The shuttle valve consists of a housing with two inlet connections, one outlet connection and a usually ball-shaped switching body. The shuttle valve thus has only two defined switching positions. In each thereof, one inlet is always blocked by the switching body, so that a hydraulic flow between the inlets is prevented.

In the event of a defect, for example a failure of the power supply, shut-off valve 27 constituted as a solenoid valve opens and thus activates safety circuit 20. Depending on the deflection state of blocking sleeve 34, a fluid flow is released either via non-return valve 46 or via parallel non-return valve 47.

Two mechanically unblockable non-return valves 43, 44 are provided for this purpose, via which alternately one of the two discharge lines can be released in the direction of tank 7. The unblocking of non-return valves 43, 44 takes place directly via auxiliary piston 45 with a deflection in the one or other direction. Unblockable non-return valves 43, 44 are shown here as separate components, but can preferably be integrated directly into end piece 30a of steering cylinder 30. By unblocking in each case of one of non-return valves 43, 44 via auxiliary piston 45 of the actuator, one of the two discharge lines is released by non-return valves 46, 47. As an alternative to the two mechanically unblockable non-return valves 43, 44, a switch-over valve can of course also be provided.

Unblocking of one of non-return valves 43, 44 takes place pressure-controlled by means of control lines 23 or 24, which are each connected to control lines 18 and 19 respectively. The non-return valves are connected mechanically to blocking sleeve 34, in such a way that, in the deflection of piston 33a shown in FIG. 5, non-return valve 43 leading to annular chamber 39 blocks, whilst the other non-return valve 44 remains closed and, in the deflection of piston 33a shown in FIG. 6, non-return valve 44 leading to piston chamber 40 conversely blocks, whilst the non-return valve 43 remains closed. The unblocking state of non-return valves 43, 44 always corresponds to the mechanically stored position of blocking sleeve 34. If blocking sleeve 34 is blocked by blocking spheres 36', non-return valves 43, 44 remain in their previously occupied position. A switch-over of non-return valves 43, 44 can thus take place only in the central position of piston 33a, if blocking spheres 36' can escape into annular groove 42.

Figure 7:
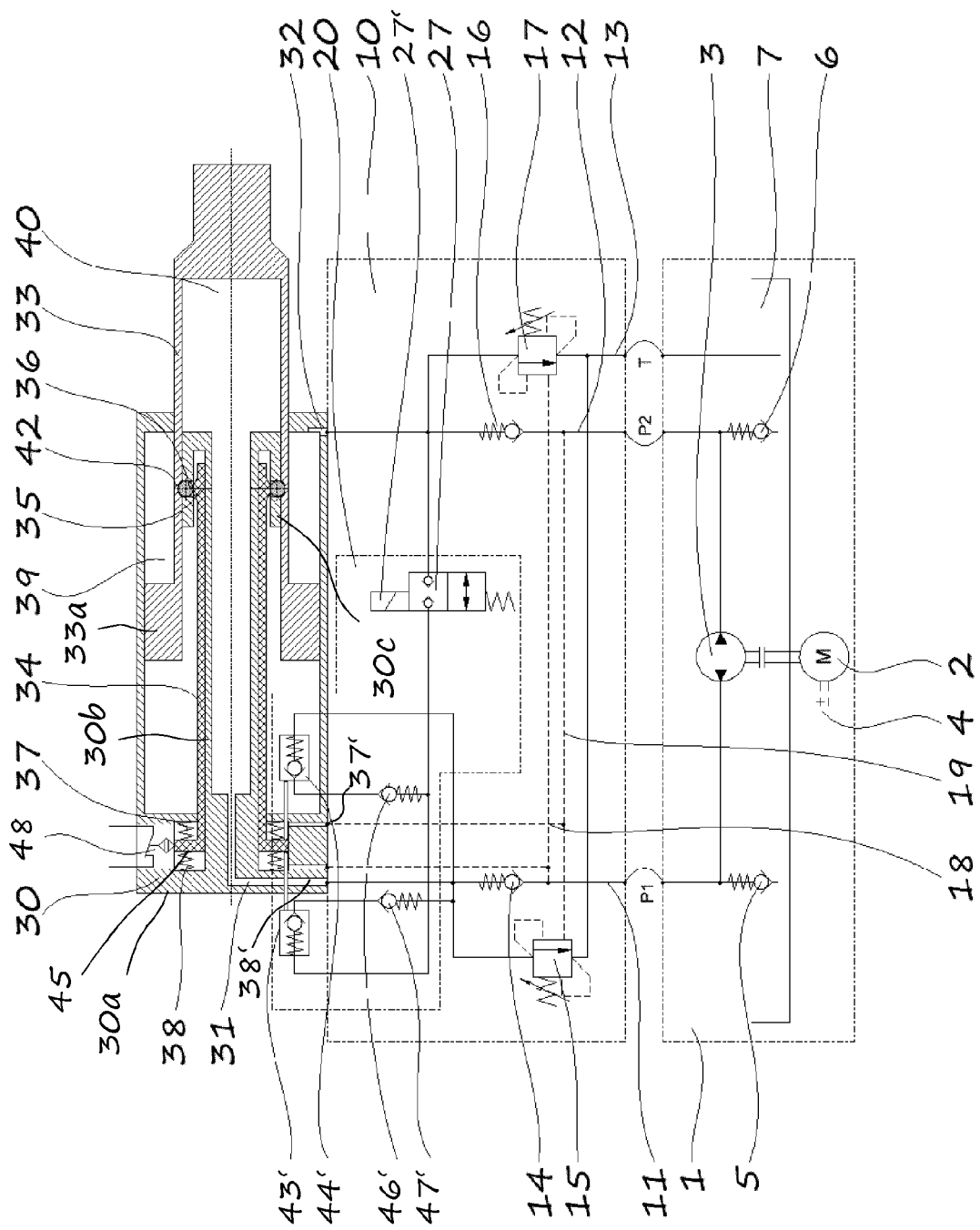
FIG. 7: a third example of embodiment of a steering cylinder with the associated valve switch in a state blocked in the central position.

Finally, a further example of embodiment is represented in FIG. 7, in which a synchronizing cylinder is used as steering cylinder 30 and, for a deactivation of the steering, a unidirectional connection between working chambers 39, 40 is switched, in order that piston 33a can be moved in the direction of the central position.

In the third example of embodiment, piston 33a of steering cylinder 30 is sealed by suitable seals (not shown) not only against the cylinder wall, but also internal pipe 30b is sealed at its end against the wall of the internal hollow space of piston rod 33. The hollow space bounded by the cylinder wall of steering cylinder 30 and piston rod 33 forms first working chamber 39 (annular chamber) and the axially internal hollow space bounded by piston rod 33 and internal pipe 33b forms second working chamber 40 (piston chamber) of steering cylinder 30. The two working chambers 39, 40 have identical hydraulically effective surfaces, so that the steering cylinder is constituted as a synchronizing cylinder.

The blocking device is constituted similar to the second example of embodiment by a sphere locking mechanism with a plurality of blocking spheres 36' distributed around the periphery, which engage in an annular groove 42 at the inside of working chamber 40 constituted in piston rod 33. The end region of internal pipe 30b is provided for this purpose with a ball cage 30c, in which the blocking spheres 36' are removed with radial play and in which blocking sleeve 34 with annular bead 35 engages in the axial direction. In the blocking position of blocking sleeve 34 shown in FIG. 7, annular bead 35 retains blocking spheres 36' in their engaged position, so that piston 33a is blocked.

Blocking sleeve 3, as in the second example of embodiment, has two blocking positions, in which it can be moved via the admission-pressure controlled actuator integrated in end piece 30a of steering cylinder 30, which is formed by the two pressure chambers 37, 38 and auxiliary piston 45 movable between the latter. Blocking spheres 36', depending on the direction of the deflection of blocking sleeve 34, can then escape into the respective other direction and release annular groove 42, so that piston 33a can be moved. The actuator is provided with a contactless sensor 48, which monitors the position of auxiliary piston 45 and relays the latter to a control device.

In the third example of embodiment, safety circuit 20 enables a direct, unidirectional fluid flow between the two working chambers 39, 40. For this purpose, two non-return valves 46', 47' arranged in parallel lines sections are provided, which open in the mutually opposite direction, i.e. release a fluid flow in the one or the other direction. Non-return valve 27 which is opened without current is arranged in series with the two non-return valves 46', 47' connected in parallel. In the normal operation, the magnetic coil of non-return valve 27 is provided with current. The bypass line between working chambers 39, 40 is thus closed and no direct fluid flow can take place between working chambers 39, 40, which leads to a piston movement in the direction of the central position.

In the case of a defect, for example failure of the power supply, non-return valve 27 opens and thus activates safety circuit 20. Depending on the deflection state of blocking sleeve 34, a fluid flow is released either via non-return valve 46' or via parallel non-return valve 47'. For this purpose, two mechanically unblockable non-return valves 43', 44' are provided. The unblocking of non-return valves 43', 44' takes place directly via auxiliary piston 45 with a deflection into the one or other direction. As a result of the unblocking of each one of non-return valves 43', 44' via auxiliary piston 45 of the actuator, one of the unidirectional flow paths is released by non-return valves 46', 47'. Unblockable non-return valves 43', 44' are shown here as separate components, but can preferably be integrated directly into end piece 30a of steering cylinder 30.

The effect of the series connection from valves 43' or 44', 27 and 46' or 47' is that, in the connection line between the two coextensive working chambers 39, 40, only a directed volume flow of the hydraulic fluid from the one into the respective other working chamber can take place and more precisely exactly until piston rod 33 has reached the locking position and blocking sleeve 34 is moved back into the central position on account of the spring force in pressure chambers 37 and 38 respectively.

If, with opened shut-off valve 27, a direct connection between working chambers 39, 40 is switched, external forces on the wheels bring about a return movement into the central position. In the central position, blocking spheres 36' are pushed outwards by locking latch 35 and, in the blocking position of the locking latch 35, the form fit between blocking spheres 36' and piston rod 33 is produced.

Also in the third example of embodiment, the hydraulically actuated actuator and the admission-pressure controlled load safety valves 15, 17 are adjusted such that the actuator is actuated with a low first pressure value and admission-pressure controlled load safety valve 15, 17 only open when a higher, second pressure value is applied at control connection, so that blocking spheres 36' release annular groove 42, before piston 33a can be moved.

Finally, it should be pointed out that the figures shown in the context of the examples of embodiment are diagrammatic and not true to scale. On the contrary, the geometrical data of the shown steering cylinder can be selected differently.

The invention claimed is:

1. A hydraulic rear axle steering for multi-axle vehicles, comprising:
 a steering cylinder (30), which comprises a cylinder chamber, a piston (33a) mounted in a sealing manner in the cylinder chamber, which divides the cylinder chamber into two working chambers (39, 40), and at least one piston rod (33) carried by the piston (33a);

the steering cylinder (30) includes a mechanical blocking device (34, 35, 36, 36'), which blocks the piston (33a) once the piston reaches a central position within the steering chamber (30);

the blocking device (34, 35, 36, 36') comprises at least one blocking member (36, 36'), which in the blocked state is retained by a locking element (34, 35) in an engaged position (42);

an actuator (37, 38, 45) by which the locking element (34, 35) is adjustable, the actuator (37, 38, 45) is actuated hydraulically separate from the piston (33a) and piston rod (33) and moves between a blocking position, in which the locking element (34, 35) holds the blocking member (36, 36') in the engaged position (42), and at least one first unblocking position, in which the locking element (34, 35) releases the blocking member (36, 36');

a return line from each of the two working chambers (39, 40) leads to a tank (7);

a hydraulically unblockable valve (15, 17) is arranged in each of the return lines;

the hydraulically unblockable valves (15, 17) comprise admission-pressure controlled valves and each include a control connection that is connected in each case to a pressure line (11, 12) leading (34, 35, 36, 36') from a pump (3) to the respective other working chamber (39, 40); and the hydraulically actuated actuator (37, 38, 45) is adjustable such that, when a first pressure value is applied, the locking element (34, 35) moves into the unblocking position and the admission-pressure controlled valves (15, 17) are adjusted such that, when a second pressure value is applied, the admission-pressure controlled valves (15, 17) open at the respective control connection, and the second pressure value is higher than the first pressure value.

2. The hydraulic rear axle steering as claimed in claim 1, further comprising at least one mechanically switchable valve (26; 43, 44; 43', 44'), which is coupled mechanically with the piston rod (33) or the locking element (34, 35), in order to connect, depending on a deflection of the piston (33a), one of the working chambers (39, 40) to a tank return line (13) or to switch a unidirectional hydraulic connection between the working chambers (39, 40) in order to enable, in case of a fault, a return movement of the piston rod (33) into the central position.

3. The hydraulic rear axle steering as claimed in claim 2, further comprising a shut-off valve (27) that is openable without current, which in normal operation of the rear axle steering blocks the hydraulic connection between the working chambers (39, 40) or to the tank return line (13) and is switched without current to deactivate the rear axle steering or in an event of a fault and releases the hydraulic connection between the working chambers (39, 40) and the tank return line (13).

4. The hydraulic rear axle steering as claimed in claim 2, wherein the mechanically switchable valve (26) comprises as a switch-over valve with three switching positions, between which the mechanically valve is switched via a modified region (41) of the piston rod (33) depending on a position of the piston, the switch-over valve (26) in a first of the switching positions connects the one of the working chambers (39) to the tank return line (13), in a second of the switching positions blocks the connection between the two working chambers (39, 40) and the tank return line (13), and in a third of the switching positions connects the other working chamber (40) to the tank return line (13).

5. The hydraulic rear axle steering as claimed in claim 2, wherewith the at least one mechanically switchable valve comprises at least two of the mechanically switchable valves (43, 44; 43', 44'), the locking element (34, 35) is movable between the first unblocking position, the blocking position and a second unblocking position and a first of the mechanical switchable valves (43; 43') is switched by the actuator (37, 38, 45) when the locking element is moved into the first unblocking position and a second of the mechanically switchable valves (44, 44'), is switched by the actuator (37, 38, 45) when the locking element (34, 35) is moved into a second unblocking position.

6. The hydraulic rear axle steering as claimed in claim 1, wherein the locking element (34, 35) is spring-loaded in a direction of the blocking position by one or more return springs.

7. The hydraulic rear axle steering as claimed in claim 1, wherein the piston rod (33) comprises a hollow space extending through the piston (33a), and the blocking device (34, 35, 36, 36') is arranged inside the hollow space of the piston rod (33).

8. The hydraulic rear axle steering as claimed in claim 7, further comprising an internal pipe (30b) projecting from an end piece (30a) of the steering cylinder into the cylinder chamber, which extends into a hollow space of the piston rod (33).

9. The hydraulic rear axle steering as claimed in claim 8, wherein the locking element (34, 35) comprises a longitudinally movable sleeve (34) inside the internal pipe (30b), which in an end region bears an annular bead (35) which forms a locking notch, which in the blocking position retains the at least one blocking member (36, 36') in the engaged position (42).

10. The hydraulic rear axle steering as claimed in claim 7, further comprising a plurality of spring tongues arranged distributed around a periphery are provided as the at least one blocking member (36), which at ends thereof each bear a snap-in nose, which engages in a recess at an inner side of the hollow space of the piston rod (33).

11. The hydraulic rear axle steering as claimed in claim 1, wherein the hydraulically unblockable valves (15, 17) comprise overpressure valves, which open when a maximum pressure value present at a medium connection connected to the respective working chamber (39, 40) is exceeded, and the maximum pressure value lies above the first and the second pressure value.

12. The hydraulic rear axle steering as claimed in claim 1, wherein a movement of the locking element (34, 35) outside the central position of the piston (33a) is blocked by the blocking member (36, 36') located in a position releasing the piston (33a).

13. The hydraulic rear axle steering as claimed in claim 1, further comprising a pump (3) for optional pressurisation of one of the working chambers (39, 40) of the steering cylinder (30) with a hydraulic medium for deflecting the piston (33a) in one or the other direction, and the pump (3) comprises a reversible pump, which is driven in an opposite direction of rotation in order to deflect the piston (33a) into the one or the other directions.

14. The hydraulic rear axle steering as claimed in claim 1, wherein the blocking member (36, 36') is engaged with play with a recess (42), which forms the engaged position for the blocking member (36, 36'), the recess (42) has an oversize compared with the blocking member (36, 36'), and the oversize is dimensioned such that a steering angle resulting due to the oversize is smaller than a predefined maximum permissible angular error.

* * * * *